United States Patent [19]
Becker et al.

[11] Patent Number: 5,567,392
[45] Date of Patent: Oct. 22, 1996

[54] DEVICE FOR THE PURIFICATION OF CONTAMINATED EXHAUST AIR THROUGH HETEROGENEOUS CATALYSIS

[75] Inventors: Oliver Becker, Losheim; Sabine Kolz, Grossrosseln; Herbert Hager, Nalbach, all of Germany

[73] Assignee: Mannesmann Aktiengesellschaft, Düsseldorf, Germany

[21] Appl. No.: 267,778

[22] Filed: Jun. 28, 1994

[30] Foreign Application Priority Data

Jun. 28, 1993 [DE] Germany ............................ 43 21 831.8
Jun. 22, 1994 [DE] Germany ............................ 44 23 329.9

[51] Int. Cl.$^6$ ..................................................... F01N 3/10
[52] U.S. Cl. ........................... 422/174; 422/176; 422/181; 422/218; 502/439; 502/527
[58] Field of Search ..................................... 422/168, 174, 422/176, 177, 181, 199, 196, 197, 218, 239; 502/439, 527

[56] References Cited

U.S. PATENT DOCUMENTS

| | | | |
|---|---|---|---|
| 3,811,845 | 5/1974 | Nakamura | 422/181 |
| 3,843,561 | 10/1974 | Sobel | 502/527 |
| 4,233,494 | 11/1980 | Pawlik et al. | 422/174 |
| 4,661,329 | 4/1987 | Suzuki et al. | 423/245 |
| 5,141,714 | 8/1992 | Obuchi et al. | 422/181 |
| 5,232,671 | 8/1993 | Brunson et al. | 422/180 |
| 5,348,922 | 9/1994 | Kuma | 502/60 |

Primary Examiner—Timothy McMahon
Assistant Examiner—Robert Carpenter
Attorney, Agent, or Firm—Cohen, Pontani, Lieberman, Pavane

[57] ABSTRACT

A device for the purification of an exhaust gas containing at least one contaminant removable through heterogeneous catalysis and flowing through a chamber having an inlet and an outlet, comprises at least one disk structure positionable within the chamber and defining a central cavity alignable with the inlet of the chamber. The disk structure includes a non-metallic, gas-permeable and flexible carrier element comprising a band woven of glass fiber yarn. The yarn is formed of individual fibers coated with a layer of pulverized zeolitic material defining a molecular sieve and having a catalytic material, selected to act adsorptively upon the at least one contaminant, dispersed therein. The device further includes a heatable metallic woven band disposed in laminar relation with the carrier element, the metallic woven band and carrier element being wound spirally end-over-end, whereby exhaust gas flowing into the central cavity from the chamber inlet passes through the woven bands and the at least one contaminant is removed therefrom. A plurality of disk elements may be stacked and positioned within a cylindrical housing a having perforated sidewall, an inlet end, and a sealed end. Exhaust gas flows through the inlet and passes through the central cavities of the disk structures, the woven bands making up the disk structures, and perforated sidewall of the housing, respectively for subsequent flow through the chamber outlet. Adjacent pairs of disk elements may be wired in series in a star configuration to respective phases of a three-phase system.

11 Claims, 2 Drawing Sheets

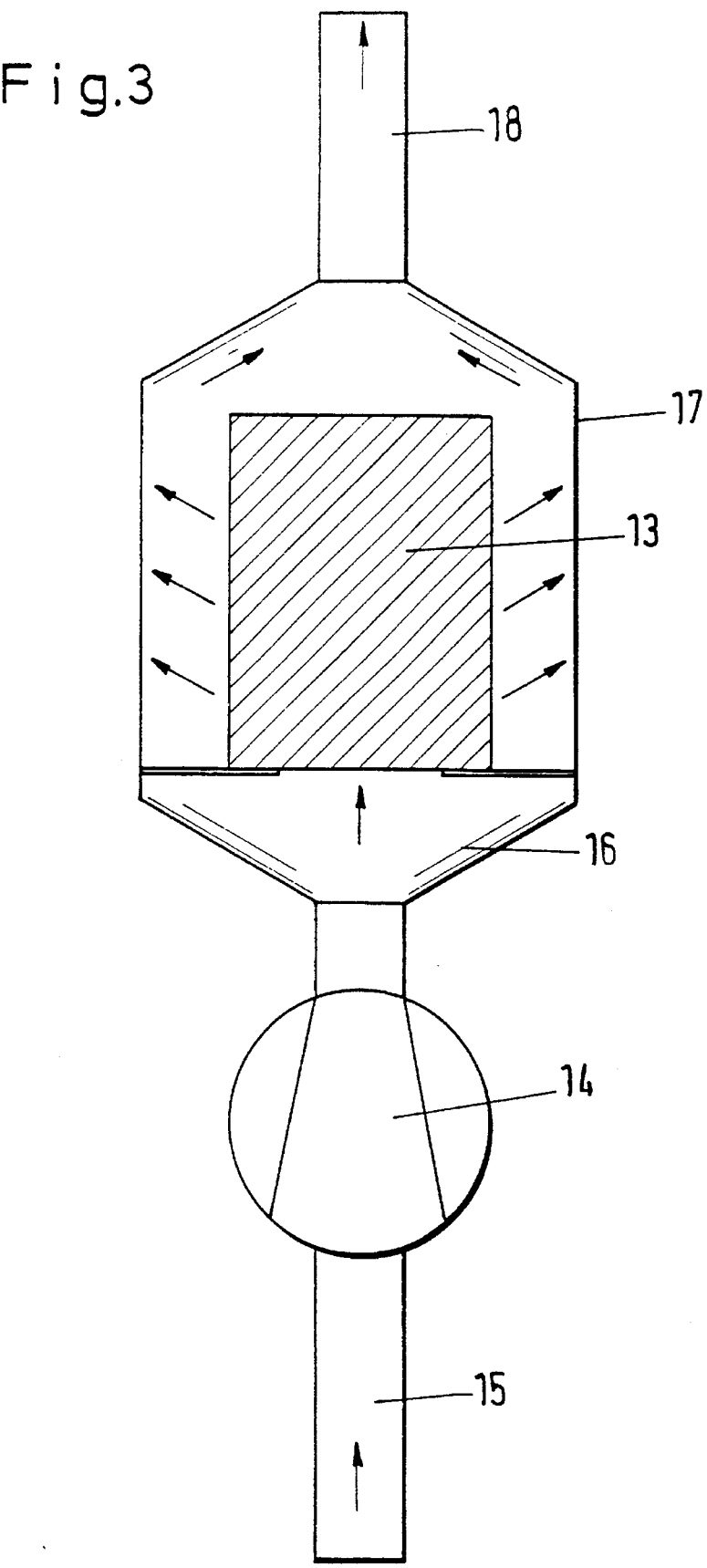

DEVICE FOR THE PURIFICATION OF CONTAMINATED EXHAUST AIR THROUGH HETEROGENEOUS CATALYSIS

BACKGROUND OF THE INVENTION

1. Field of the Invention

The invention relates to air purification systems, and more particularly, to a device for the purification of contaminated exhaust air through heterogenous catalysis.

2. Discussion of the Prior Art

A device for conducting catalytic reactions is proposed in German specification DE AS 1003192. The carrier material is a wire, preferably made of a chrome-nickel alloy, which is coated with a thin, firmly adhering coat of a temperature-stable and highly porous oxide, e.g., aluminum oxide, or with a mixture of various oxides. The coating is subsequently impregnated with an active catalytic material, e.g., platinum. After undergoing this treatment, the coated wires are wound into flat coils and mounted in a coil holder. In the resulting arrangement of multiple connected coils, the individual flat coils are insulated electrically and in terms of contact by an intervening mica layer. Disadvantageously, such a coil arrangement is instable at a particular transfer cross section. The flat coils must therefore be carefully held by their outermost edge in the coil holder, so as to avoid sag when a coil is heated. The total area available for heterogeneous catalysis on each flat coil is limited, since the outer edge is covered by the coil holder. In addition, the mica strip between the two flat coils forms a blocking layer, so that only part of the surface of the flat coil located above the mica layer (seen in the flow direction) is involved in the catalysis. Larger cross sections cannot be produced in the suggested manner, since without an appropriate support the flat coil would sag from its own weight. Skilled personnel are needed to manufacture and handle the flat coils, because the wires are very thin and have a diameter of less than one mm. Another disadvantage is that the resistance wire is coated with the oxide layer before being wound, so that there is always a danger that the brittle film coating will partially flake off, possibly leading to shorting contacts in the turn area.

A catalytic filter for diesel soot is proposed in published German specification DE 37 16 446 A1 in which a coating of metal-doped zeolite is applied to a permanent filter element, preferably a honeycomb body with reciprocally closed channels. The doped metal is preferably platinum. The suggested coating of the filter element serves to lower the ignition point for the thermal combustion of the adsorbed soot particles. In order to keep the required quantity of noble metal low, the noble metal is finely distributed by means of a zeolitic base. The effectiveness of this process must be questioned, since the dimensions of a soot particle are larger by a power of ten than the pore size of the zeolite used. This means that a large part of the applied noble metal cannot act catalytically, because the individual soot particles will not fit into the small pores and no contact is established with the doped noble metal particles located there. Furthermore, a large portion of the platinum is spatially fixed in the zeolite and cannot come into contact with the soot particles.

A generic device for the purification of contaminated exhaust air is known from DE 43 39 025 A1. This device consists of a non-metallic, gas-permeable and windable carrier element which utilizes individual ceramic fibers coated with a layer of a material that acts in an adsorptive manner. The carrier material is connected sandwich-fashion to a heatable metallic woven band, which band is coated with catalytic material. The entire element is located in a housing equipped with an inlet and an outlet through which the contaminated gas can be introduced and the purified gas can be extracted. A disadvantage of this arrangement is the excessively small specific surface of the carrier element and the unfavorable placement of the catalytic material.

A filter for diesel soot is disclosed in U.S. Pat. No. 5,180,409 which consists of a single-layer or multi-layer fabric of, preferably, ceramic yarn. For lower temperatures (between 330° and 550° C.) a glass fiber yarn can also be used. In order to reinforce the fabric, a flexible filling yarn is also woven into it. The fabric is not coated, and because of the large gaps between the individual yarn elements it is not suitable for use as an adsorbate. Furthermore, the filter cannot be regenerated and must be changed after a preset maximum pressure loss is reached.

It is therefore an object of the present invention to provide a compact, easily fabricated device for the purification of contaminated exhaust air through heterogenous catalysis with prior adsorption and desorption, with which it is possible, in a regenerable fashion and without removing the filter element, to purify the gas contaminated with various constituents more efficiently and using less energy, compared to known units, even at fluctuating contaminant concentrations of less than 100 mg/cbm.

SUMMARY OF THE INVENTION

The aforementioned object, as well as others which will become apparent to those skilled in the art, are achieved in contrast to the known prior art, by an element in which the carrier material for the coating substances is a band woven of glass fiber yarn. The yarn is a filament yarn of individual glass fibers that is coated with a finishing in order to increase temperature stability. The advantage of the woven band configuration, compared to the known fabrics, is that the woven band has a larger active surface and greater gas permeability in the sense of a sharp deflection of the gas flow. If, in addition to this, the band is wound, surfaces are achieved which considerably exceed those of multiple fabric parts placed one atop the other. Moreover, it is possible, for example, by using a reel and a housing covering, to wind practically any desired diameter without the device becoming instable. It is desirable for the filament yarn to have a right/right weave structure. In contrast to activated charcoal, the suggested woven band is not combustible and will maintain its structure even at high temperatures (up to 700 degrees Celsius).

In accordance with the present invention, the woven band which serves as the carrier material, together with the metallic woven band of the same width, is wound spirally end-over-end into a disk with an axial hole through the center. This disk is coated with a zeolitic molecular sieve that in itself is known; however, in contrast to the known prior art, the zeolitic molecular sieve is in pulverized form.

In this pulverized form, the zeolitic molecular sieve has a considerably larger surface, compared to a known adsorber bed. Catalytic material, preferably platinum, is implanted by means of the known sol-gel process in the adsorptive layer.

The use of a zeolitic molecular sieve applied to the carrier element as the adsorption medium in a timely distributed pulverized form, has several advantages over other known adsorptive materials. Adsorption is effective even at high temperatures, i.e., up to approximately 200° C. Efficiency declines as temperatures rise, however, because the oscillation amplitude of the adsorbed contaminant molecule increases and once a certain temperature is reached the linkage forces are no longer sufficient and desorption occurs. Another advantage of the zeolitic molecular sieve utilized by the present invention lies in the fact that even the smallest concentrations of contaminants in the exhaust air to be purified are captured, in contrast to activated charcoal. In the case of activated charcoal, the adsorptive capacity rises to useful values only at higher concentrations. Because the zeolitic molecular sieve is a synthetically manufactured substance, it can be produced with precisely defined characteristics, including pore size, while activated charcoal has a distribution of pore sizes across several powers of ten. Furthermore, there are various types of molecular sieve with respect to the characteristic of being water-repellent (hydrophobic) or water-attracting (hydrophile), and deliberate advantage can be taken of these for the adsorption of various contaminants in the exhaust air mixture. The entire element can be coated optionally with various types of zeolite or with a mixture, whereby proportions may vary. The advantage of this is that the filter can be precisely matched to a particular type of contaminant. It is also possible to connect filters that have different types of zeolite in parallel or serial fashion, so that even a very complex mixture of various contaminants can be treated so as to eliminate these contaminants.

The removal of adsorbed contaminants occurs via catalytic combustion, for which an active catalytic material is applied to the entire element after the adsorptive coating. The catalytic coating is applied via the known sol-gel process. Depending on the particular manufacturing conditions, gels with various characteristics are obtained. The homogeneous distribution of the initial components (e.g., platinum particles) is maintained during the gelling process. After drying, a $SiO_2$ network forms in which the platinum particles are dispersed.

By applying the catalytic material in this manner, the adsorptive effect of the entire element is increased, and the sites of adsorption and catalytic combustion are located directly next to one another.

The entire coated element is heated in the known manner via a deformable heating element which is connected to a voltage source and forms, with the carrier element, a single unit. Preferably, this heating element is a metallic woven band of a highly temperature-stable material, e.g., a chrome-nickel alloy. The mesh size of this metallic woven band is preferably less than 1 mm, while the diameter of a single wire is preferably less than 0.3 mm. Because the metallic woven band is flexible, it can be folded sandwich-fashion into a tubular module or a box-type module. So that the process temperature required for catalytic combustion can be set, a temperature sensor can be attached to the heating element. Preferably, this is a thermocouple attached to the metallic woven band through laser welding. More advantageously, the heating is controlled by measuring the change in the electrical resistance of the element. Individual modules constructed as catalysts can be combined by serial or parallel connection into larger units. For this purpose, at least two and preferably up to six disks are placed on top of one another, separated by mica disks, in a cylindrical housing. The mica disks ensure that no electrical short circuits occur between the individual disks. The housing has a perforated inner and outer covering, so that the exhaust air to be purified can be fed without obstruction to the module and the purified air can be extracted. The gas is conducted in an essentially radial fashion from the inside to the outside, i.e., at right angles to the module axis. The front sides are provided with a lid which seals the two outermost disks and encompasses the inner and outer covering.

The electrical connection of such a module calls for two disks at a time to be electrically connected in series.

In addition to neutralizing odors from large-scale kitchens, concentrations of livestock, foodstuff and luxury-food production facilities and the pharmaceutical industry, this technique can remove the essential known combustible and organic substances. Given this broad application spectrum, it must be anticipated that the exhaust air to be purified will also be contaminated with solid dust particles. In addition, there may be components in the exhaust air which form ash particles during catalytic combustion. Such components must be removed in advance, so that the element does not become dirty or clogged after a short period of operation. It is therefore suggested that in these cases an appropriate separator be connected in front of the element. Separators for dust particles and for components that lead to ash particles are sufficiently known, so that a more detailed discussion of them is unnecessary. Here it must be noted that the exhaust air, particularly that from large-scale kitchens, may contain a very high proportion of steam. Because the saturation limit of the exhaust air for steam depends heavily on temperature, care must be taken to ensure that the temperature does not fall below the dew point on the way from the exhaust point to the separating element. Otherwise, the condensed water drops will form what amounts to a quasi-blocking layer on the adsorbate, making adsorption of the contaminants more difficult, if not impossible.

The advantage of the device according to the invention can be seen in the fact that the device is constructed as a compact, stable adsorbate with a very large surface area, in which the adsorption point for the gaseous contaminant molecules to be separated and the location of catalytic combustion are the same. In addition, this device can be regenerated as often as desired, since the regeneration phase takes place in a temperature range which does not change or negatively effect the adsorbate. Another advantage of the suggested device is the temperature stability of its material in comparison to the known activated charcoal. The special measures needed during the desorption of contaminants adsorbed into activated charcoal can be omitted in the suggested device. The device is easily adapted to any type of contaminant composition, since in the zeolitic molecular sieve that is used the required pore size or the spectrum of desired pore sizes can be precisely set. Furthermore, a suitable zeolitic type in respect to the characteristic of water-repellency or water-rejection can be selected.

The combination of a woven band as the carrier element with the coating of a zeolite and a catalytic material deposited via a sol-gel process permits a spectrum of applications ranging from odor neutralization of foul-smelling gaseous mixtures to purification of heavily-contaminated exhaust air. Depending on the particular requirement, the device can be miniaturized in order to permit easy installation in existing exhaust air conduits or, on the other hand, can be designed with dimensions allowing industrial use, e.g., in sewage treatment plants. Because the module constitutes a separate unit, it can be inserted and removed at any time to be tested or checked, without the entire unit having to be disassembled. Except for the electrical connections of the heating and temperature measurement elements and, possibly, several alignment or holding screws, no further assembly or disassembly is required.

Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

BRIEF DESCRIPTION OF THE DRAWINGS

In the drawings, wherein like reference characters denote similar elements throughout the several views:

FIG. 3 is a schematic diagram depicting a typical installation employing the module of the present invention.

DETAILED DESCRIPTION OF THE PREFERRED EMBODIMENTS

Figure 1:
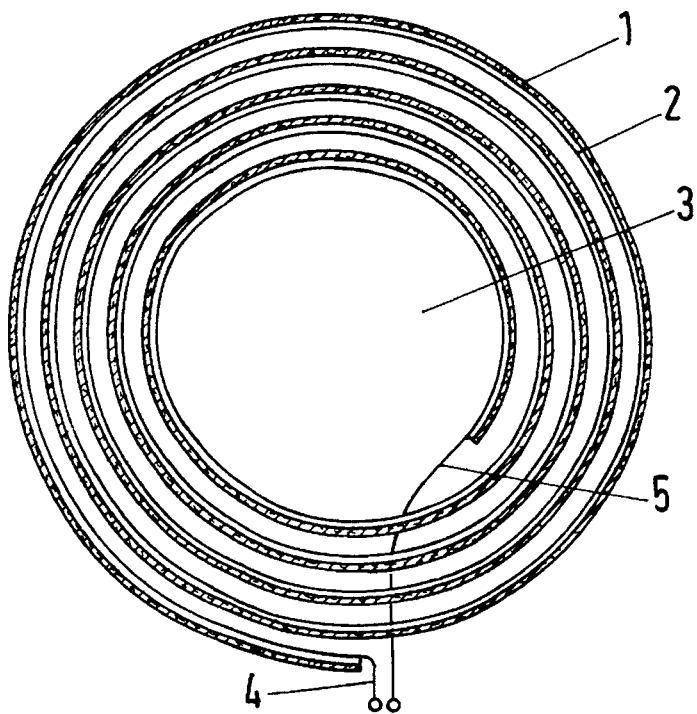
FIG. 1 is a cross-sectional view of a pipe module constructed in accordance with the present invention.

FIG. 1 is a schematic depiction in cross-section of a purification device constructed in accordance with an illustrative embodiment of the present invention. In this example, the sandwich-like carrier element 1, i.e., a weave consisting of glass fibers, and the metallic woven band 7 that functions as the heating element, are wound spirally into a tubular module.

It will be readily apparent to those skilled in the art that such winding is possible only if both of the elements, i.e., the carrier element 1 and the heating element 2, are flexible. Such winding is not possible in many of the carrier elements commonly employed in prior art systems, such as honeycomb bodies, mineral wool, ceramic foam, and the like. For clarity, the individual winding layers are depicted in FIG. 1 at a distance from one another. In reality, however, the layers lie one atop the other with no space between them, in order to produce a disk that is compact. An area 3 is left free in the center, to define a flow path for the gas supply. At each end of the heating element 2, a corresponding link 4, 5 is welded on, to define terminals connectable to a suitable voltage source. The entire element is coated with a zeolitic molecular sieve of a particular type, i.e., hydrophobic or hydrophilic or a mixture of both types. This adsorption layer is in turn impregnated with an active catalytic material, preferably platinum, via a sol-gel process.

Figure 2:
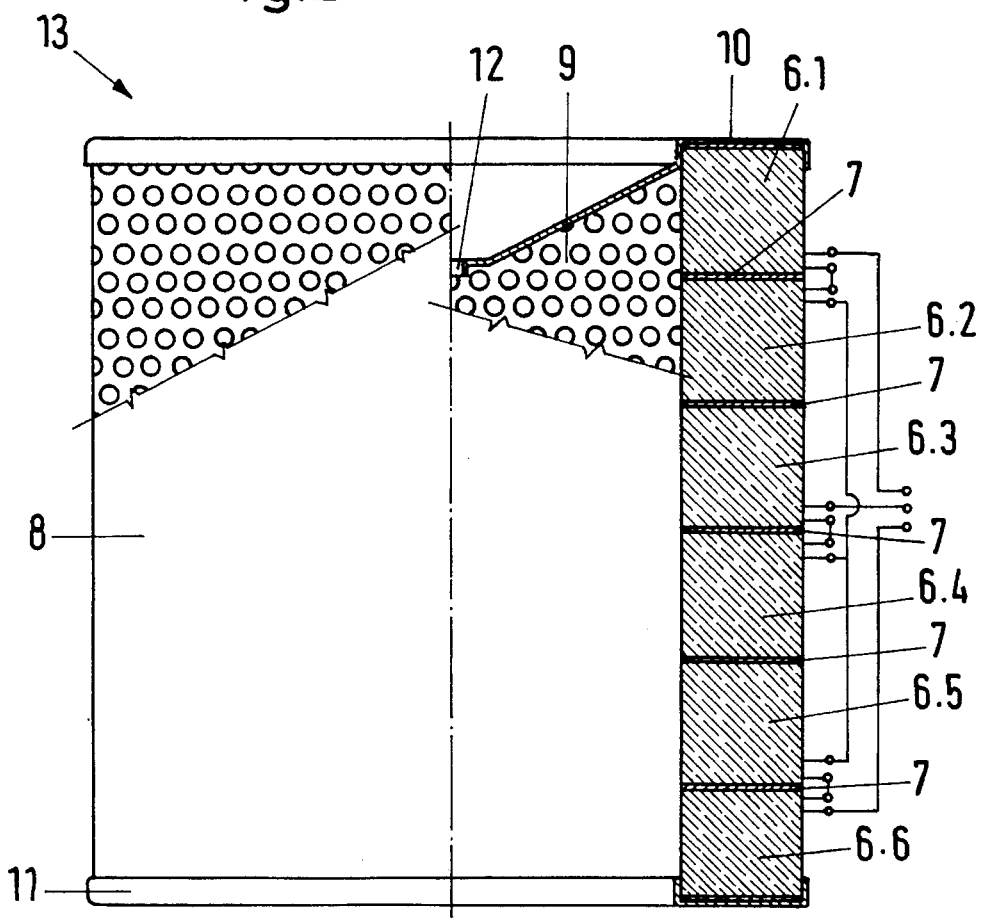
FIG. 2 is a partial broken view of a module constructed in accordance with the present invention and multiple disks.

FIG. 2 shows a half-side longitudinal section and a half-side view of a module 13 with several disks. In the illustrated embodiment, a total of six disks 6.1–6.6 of the type shown in FIG. 1 are located in a housing. The individual disks 6.1–6.6, which lie one on top of the other, are separated from each other by the mica disks 7. This is to prevent an electrical short between the heating elements 2 of two neighboring disks, e.g., 6.1 and 6.2. The outer and inner sides of the disks 6.1–6.6 are each encompassed or covered by a perforated tin covering 8, 9. The connection on the front side is formed in each case by a lid 10, 11, which encircles the outermost disks 6.1–6.6 and also encompasses the outer covering 8 and inner covering 9. In each case, two adjacent disks (6.1 and 6.2, 6.3 and 6.4, 6.5 and 6.6) are connected in series. These are connected, in each case, to one phase of a 400 V three-phase current network and connected in a star configuration. The hole 12 in the upper lid 10 serves for the attachment of the module 13, whereby a rod (not shown), having a threaded end of which can be connected to a bearing plate or other holding device (not shown), is extended through the hole 12.

FIG. 3 is a schematic diagram of a complete set-up of a purification unit configured with the module 13 described in FIG. 2. By means of a ventilator 14 or a fan, the exhaust air to be purified is introduced via an inlet pipe 15. The exhaust air flows into a funnel-shaped chamber 16 which, matching the opening 3 (FIG. 1) of the module 13, is closed at the top. In this configuration, exhaust air is forced by the ventilate fan into the inner space of module 13.

As shown in FIG. 2, the opening by which exhaust air flows through module 13 is closed off by lid 10.

The purification system shown and described in FIG. 3 represents only one possible application of a module 13. For example, the module can be smaller or larger. A reversal of the air flow, i.e., from outside to inside, is also conceivable and useful for special applications.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, however, therefore, to be limited only as indicated by the scope of the claims appended hereto.

The invention is not limited by the embodiments described above which are presented as examples only but can be modified in various ways within the scope of protection defined by the appended patent claims.

We claim:

1. A device for the purification of an exhaust gas containing at least one contaminant removable through heterogeneous catalysis and flowing through a chamber having an inlet and an outlet, comprising:

at least one disk structure positionable within a chamber and defining a central cavity aligned with an inlet of the chamber, said disk structure including:

a non-metallic, gas-permeable and flexible carrier element comprising a band of glass fiber yarn, said yarn comprising individual fibers coated with a layer of pulverized zeolitic material defining a molecular sieve and having a catalytic material, selected to act adsorptively upon the at least one contaminant, dispersed therein; and an electrically heatable metallic woven band disposed on said carrier element, said metallic woven band and said carrier element being wound spirally end-over-end, whereby exhaust gas flowing into said central cavity from the chamber inlet passes through said bands and said at least one contaminant is removed therefrom.

2. The device according to claim 1, wherein said yarn is a woven filament yarn of individual glass fibers coated with a temperature stable finishing.

3. The device according to claim 2, wherein said filament yarn has a right/right weave structure.

4. The device according to claim 1, wherein said pulverized zeolitic material includes a hydrophilic and a hydrophobic zeolite.

5. The device according to claim 1, wherein said metallic woven band includes first and second electrical terminals connectable to a voltage source, said metallic band being heatable by resistive heating, the first and second electrical terminals being respectively connected to opposite ends of the metallic woven band.

6. The device according to claim 1, further including a housing defining an interior cavity and a lid for sealing one end of said interior cavity, a plurality of aligned disk structures being disposed within said interior cavity, wherein the central cavity of a first of said disk structures is alignable with the chamber inlet and the central cavity of a second of said disk structures is sealed by said lid.

7. The device according to claim 6, wherein adjacent disk structures of said plurality are separated by an annular ring of electrically insulating material.

8. The device according to claim 6, wherein each of said plurality of disk structures are electrically coupled.

9. The device according to claim 8, wherein six disk structures are disposed within said interior cavity, adjacent pairs of disk structures being electrically connected in series to a respective phase of a three phase network in a star configuration.

10. The device according to claim 6, wherein said housing has a cylindrical shape, a sidewall of said housing being perforated to define a flow path for exhaust gas flowing through said disk structures.

11. The device according to claim 6, wherein said lid defines a central opening through which a rod is extendable.

* * * * *